United States Patent Office 3,216,989
Patented Nov. 9, 1965

3,216,989
PROCESS FOR PRODUCING IMPROVED POLY-
OLEFINS OF CONTROLLED MOLECULAR
WEIGHT
Gerhard Meyer, Obernburg (Main), Wolfgang Rösener, Erlenbach (Main), and Erhard Siggel, Laudenbach (Main), Germany, assignors to Vereinigte Glanzstoff-Fabriken A.G., Wuppertal-Elberfeld, Germany
No Drawing. Filed Nov. 8, 1962, Ser. No. 236,424
Claims priority, application Germany, Dec. 28, 1961,
V 21,796
4 Claims. (Cl. 260—93.7)

The present invention is directed to an improved process for polymerizing olefins. More particularly, the subject invention relates to a process for producing polyolefins of controlled molecular weight which have improved color characteristics, and the like.

The polymerization of olefins with the aid of particular catalysts in organic, and preferably aliphatic, dispersing agents is well known. In the production of linear polyolefins the so-called stereospecific catalysts are especially useful. These catalysts consist of mixtures of metal salts and metal-organic compounds. Of these compounds mixtures of titanium trichloride and aluminum trialkyls have become of greatest importance. The polyolefins which are produced with the aid of these catalyst mixtures have a very high molecular weight and are distinguished by a high content of isotactic polymer molecules. These isotactic polymerizates, unlike amorphous low-molecular constituents (likewise contained in the precipitated polymerizate) are not soluble in conventional extraction agents (such as heptane) which are used for the purification of the polymers. Although the properties of isotactic polyolefins are much desired, especially where the polymers are to be processed into threads or films, difficulties of considerable magnitude are caused by the high molecular weight and high melt viscosity of the products. These problems are well known in the art and various solutions have been proposed which attempt to produce or to treat polyolefins in such a manner that they can be processed in known melt-spinning apparatus.

In one of the prior art processes, a thermal decomposition is carried out ahead of or within the melting apparatus. This method makes necessary an additional step in the process. Furthermore, the thermal treatment causes not only a decomposition of the polymer molecules but also simultaneous damage to the product as, for example, the reduction of the temperature stability and strength of the polymerizate. The thermal decomposition also has a harmful effect on the color of the product.

In another known process, an attempt is made to control the viscosity of the polymerizate by carrying out the polymerization step in the presence of hydrogen or alkyl halides. Although polymerizates with lower viscosities are produced by this process, the proportion of extractable components is increased and, accordingly, the yield of isotactic polymerizate is lowered.

It has also been proposed that polyolefins with lower molecular weights can be produced if the polymerization is carried out in the presence of metal compounds of the second subgroup of the Periodic System such as zinc, cadmium or mercury alkyls, these compounds being used simultaneously with the above mentioned stereospecific catalysts. If the polymerization is carried out according to this process, for example, with the addition of zinc diethyl, the claimed effect, however, does not occur. No lowering of the molecular weight or viscosity of the polyolefin takes place in comparison with a polymerizate which is produced without the use of zinc diethyl. This can be explained by the fact that zinc diethyl is monomolecular and nonpolar, and therefore electrically neutral in the anhydrous inert hydrocarbons which are used in the polymerization of olefins. The polymerization, as is well known, proceeds according to an ionic mechanism, namely, in the presence of an anionic catalyst. It is self-evident that the nonpolar zinc diethyl cannot participate in the reaction and, accordingly, cannot influence the properties of the polymerization products. The use of cadmium or mercury alkyls is not feasible because these compounds are too expensive for a commercial operation.

A novel process for controlling the molecular weight of polyolefins is described in our copending application Serial No. 231,502, which application was mailed to the Patent Office on October 17, 1962. In the aforementioned application, a process is disclosed in which the molecular weight of the polyolefins is controlled by carrying out the polymerization in the presence of organic aluminum compounds, titanium trichloride, zinc diethyl, and any compound which forms complexes with the zinc diethyl. Suitable complex-forming compounds include, for example, ethyl iodide, diethyl ether, pyridine, lithium butyl, aluminum chloride, aluminum bromide, tetra-n-butylammonium iodide, tetra-n-hexylammonium bromide, tetra-n-butylphosphonium bromide, triethylamine, dimethyl aniline, diiso amyl sulfide, etc. The amount of complex-forming compound that is added to the reaction mixture can vary from about 4 to about 10 mol percent with reference to the zinc diethyl. The molar ratio of zinc diethyl to titanium trichloride lies between 0.2:1 and 4:1, and preferably between 1:1 and 3:1.

The use of the compounds which form complexes with zinc diethyl makes it possible to reduce considerably the viscosity of the resulting polyolefin. Depending upon the amount of zinc diethyl and of the complex-forming material and according to the type of complex-forming compound the viscosity of the polyolefin can be reduced, for example, to one-half the value that the polyolefin would have had by polymerizing in the known manner with titanium trichloride, aluminum trialkyl, and zinc diethyl. A special advantage of the subject process lies in the fact that the proportion of isotactic polymerizate with respect to the products which are produced in the polymerization is not reduced by the use of the subject zinc diethyl complex-forming compounds.

Although the use of the complex-forming compound as described in our prior application provides substantial advantages, this process still is not satisfactory in all respects. In all cases in which zinc diethyl and aluminum trialkyls are borught together in a reaction mixture a precipitation of zinc is caused which leads to a discoloration of the polymerizates. The reduction of zinc diethyl to zinc is due to the reaction of zinc diethyl with aluminum alkyl hydride which is always present in aluminum alkyls. The precipitation of the zinc depends upon the purity of the components employed in the reaction and on the reaction temperature. Depending upon the purity of the components the precipitation takes place at varying times and with varying speed. For this reason, during the course of the polymerization zinc diethyl is withdrawn from the reaction mixture in an uncontrollable amount. Obviously, the formation of the zinc diethyl complexes which influences the molecular weight of the polymer also abates so that eventually high molecular weight products are again formed. The distribution curve of such polyolefins shows a more or less large proportion of extremely high molecular weight products. Although it its theoretically possible to supply zinc diethyl continuously during the entire polymerization period, it is not possible to control the rate and quantity of zinc diethyl which is reduced to zinc so that neither the necessary amounts nor the speed of the addition can be determined.

The precipitation of the zinc causes a noticeable discoloration of the polymerizates. Furthermore, the zinc can only be dissolved out by treatment with strong acids.

It is an object of the present invention to provide a process for producing polyolefins of controlled molecular weight in which zinc is not precipitated.

Another object of the invention is to provide a process for producing improved polyolefin polymerizates of controlled molecular weight.

Other objects will become apparent to those skilled in the art from the following detailed description of the invention.

In general, the present invention comprises the discovery that the disadvantages inherent in the prior art processes can be avoided if in the polymerization of olefins with the use of titanium trichloride, aluminum trialkyls, zinc diethyl, and complex-forming compounds, small amounts of compounds are added to the reaction mixture having the following general formula:

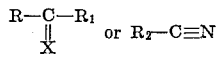

wherein R represents an alkyl, aryl, cycloalkyl, aralkyl, caroxyl aryl or carboxy alkyl group; $R_1$ is hydrogen or an alkyl, aryl, cycloalkyl, or aralkyl radical or is one of the group

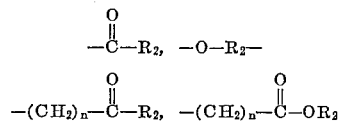

$n$ is either one or two; X is either oxygen or sulfur; and $R_2$ is an alkyl, aryl, cycloalkyl, or aralkyl radical. In each case the alkyl substituent preferably has from 1 to 6 carbon atoms and more preferably from 1 to 2 carbon atoms. The amount of additive which is added to the reaction mixture should be at least about 7.5 mol percent with respect to the aluminum trialkyl. Ordinarily, from 7.5 to 55 mol percent will be used in the process.

Among the additives which can be used in the process are those which dissolve in the inert hydrocarbons used in the polymerization reaction. Such compounds would include monoketones such as acetone, methylethyl ketone, acetophenone, benzophenone; diketones such as diacetyl, benzil, acetylacetone, acetonylacetone; keto acid esters such as acetoacetic acid ethyl ester, pyroracemic acid ethyl ester; carboxylic acid esters such as acetic acid ethyl ester, benzoic acid ethyl ester, phthalic acid dibutyl ester; nitriles such as acetonitrile, benzonitrile, adipodinitrile; and aldehydes such as acetaldehyde, paraldehyde, and benzaldehyde.

In carrying out the subject process, the above described compounds can be dissolved together with zinc diethyl and the complex-former in an inert hydrocarbon, and this solution can then be added slowly to the reaction charge. It is believed that the activity of the zinc alkyl complexes is maintained during the entire course of polymerization due to the fact that the compounds described above are capable of reacting more rapidly than zinc diethyl with the hydride-oxygen which is present.

The subject process can best be understood by reference to the following example.

*Example*

In this example a series of experiments were carried out which are summarized in the table which appears below. In the experiments an enameled agitator autoclave was used having a useful volume of 150 liters. In the autoclave was placed 105 liters of solvent with the exclusion of moisture and air. The amount of aluminum triethyl indicated in the table was dissolved in 5 liters of the same solvent, and this solution was added to the contents of the autoclave, heated to 75° C., and agitated for 30 minutes. Thereafter, purified titanium trichloride was made into a paste in 5 liters of solvent. In a further charge, zinc diethyl, a complex-former, and a compound indicated in column 5 of the table were dissolved in 5 liters of solvent, and this solution was introduced into the autoclave simultaneously with the titanium trichloride slurry or paste. Thereafter, propylene was introduced into the autoclave with constant agitation and under a pressure of 4 atmospheres. The pressure was maintained until a polymerizate concentration of 23% was obtained. The polymerizate was then worked up in the known manner and dried. The polypropylene was then subjected to an extraction with boiling n-heptane. The extraction residue, which consisted of isotactic polypropylene, was dried. The viscosity value determinations given in column 7 of the table were accomplished by measurement of a 0.1% solution in decalin at 135° C.

TABLE

| Expmt. No. | $TiCl_3$, mol/l.* $\times 10^{-3}$ | $Al(C_2H_5)_3$, mol/l.* $\times 10^{-3}$ | $Zn(C_2H_5)_2$, mol/l.* $\times 10^{-3}$ | Complex-former, mol/percent with reference to $Zn(C_2H_5)_2$ | Compound preventing Zn precipitation, mol/percent with reference to $Al(C_2H_5)_3$ | Yield of isotactic polypropylene | Viscosity of polymerizates | Polymerization solvent | Remarks |
|---|---|---|---|---|---|---|---|---|---|
| 1 | 4.06 | 8.80 | 8.50 | 3.85 ethyl iodide | 7.5 dibutylphthalate | 81.4 | 1.78 | Heptane | No zinc precipitation. |
| 2 | 3.90 | 7.90 | 7.30 | 7.31 pyridine | do | 81.7 | 1.83 | Hexane | Do. |
| 3 | 2.70 | 5.50 | 7.60 | 5.35 pyridine | 15 ethylbenzoate | 84.4 | 1.97 | do | Do. |
| 4 | 4.06 | 5.49 | 5.40 | 7.31 diethylether | 15 paraldehyde | 81.4 | 2.36 | Heptane | Do. |
| 5 | 4.06 | 8.80 | 8.50 | 4.82 diethylether | 15 acetylacetone | 75.0 | 1.99 | do | Do. |
| 6 | 3.25 | 5.48 | 7.61 | 3.74 ethyl iodide | 15 acetone | 79.6 | 2.34 | Hexane | Do. |
| 7 | 3.90 | 7.90 | 7.60 | 7.24 ethyl iodide | 15 acetylacetone | 82.6 | 1.96 | do | Do. |
| Control example: | | | | | | | | | |
| 8 | 4.06 | 8.80 | 7.30 | 5.35 pyridine | | 80.9 | 1.89 | do | Substantial precipitation of zinc. |

*With reference to the solvent.

In carrying out the polymerization it is possible in a simple manner in each case to determine the minimum concentration of the subject additives at which the precipitation of zinc is still prevented in combining zinc diethyl and aluminum triethyl. The amounts given in the following list of individual compounds represent the minimum amount needed in order to eliminate entirely the precipitation of the zinc. The determination was made by dissolving 10 mmol of aluminum triethyl in 50 cc. of n-heptane. In another 50 cc. of n-heptane, 10 mmol of zinc diethyl and the compound preventing zinc precipitation was dissolved. This solution was added to the aluminum triethyl solution. The combined reagents were heated for 24 hours under reflux. The amount of additive was increased little by little, from 5 mol percent with reference to the aluminum triethyl, by increments of 2.5 mol percent. With an addition of 5 mol percent phthalic acid dibutyl ester, for example, a weak grayish coloration was still detected, whereas with an additive quantity of 7.5 mol percent no additional zinc precipitation occurred.

The following table gives the minimum additive amounts by which zinc precipitation is avoided for a number of compounds which are suitable for use in the subject process.

*Minimum amount at which no further zinc precipitation takes place in mol percent with reference to aluminum triethyl*

Additive:

| | |
|---|---|
| Paraldehyde | 15 |
| Acetaldehyde | 15 |
| Benzaldehyde | 55 |
| Acetone | 15 |
| Acetophenone | 30 |
| Acetylacetone | 15 |
| Acetonylacetone | 15 |
| Diacetyl | 15 |
| Benzil | 15 |
| Phthalic acid dibutyl ester | 7.5 |
| Benzoic acid ethyl ester | 15 |
| Acetic acid ethyl ester | 15 |
| Acetoacetic acid ethyl ester | 7.5 |
| Pyroracemic acid ethyl ester | 15 |
| Benzonitrile | 15 |
| Acetonitrile | 15 |

Obviously many modifications and variations of the invention as hereinbefore set forth may be made without departing from the spirit and scope thereof, and therefore only such limitations should be imposed as are indicated in the appended claims.

We claim:

1. An improvement in a process for controlling the molecular weight of polypropylene produced by the polymerization of propylene in inert hydrocarbons with the use of an aluminum trialkyl, titanium trichloride, zinc diethyl, and compounds which form complexes with zinc diethyl, which improvement comprises: adding to the polymerization mixture a compound having the formula selected from the group consisting of

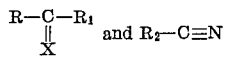

wherein R is a member selected from the group consisting of alkyl, aryl, cycloalkyl, aralkyl, carboxy aryl, and carboxy alkyl; X is a member selected from the group consisting of oxygen and sulfur, $R_1$ is selected from the group consisting of hydrogen, alkyl, aryl, cycloalkyl, aralkyl and one of the group

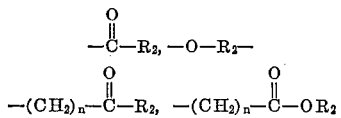

and wherein $R_2$ is selected from the group consisting of alkyl, aryl, cycloalkyl, and aralkyl.

2. A process as in claim 1 wherein the amount of additive added to the polymerization mixture is at least about 7.5 mol percent with reference to the aluminum triethyl.

3. An improved process as in claim 1 wherein said compound added to said polymerization mixture is methyl ethyl ketone.

4. An improved process as in claim 1 wherein said compound added to said polymerization mixture is diacetyl.

References Cited by the Examiner

UNITED STATES PATENTS

| 2,881,156 | 4/59 | Pilar et al. | 260—94.9 |
| 2,886,561 | 5/59 | Reynolds et al. | 260—94.9 |

JOSEPH L. SCHOFER, *Primary Examiner.*